United States Patent [19]
Mercer et al.

[11] Patent Number: 6,095,460
[45] Date of Patent: Aug. 1, 2000

[54] EXHAUST SYSTEM SUPPORT ARRANGEMENT

[75] Inventors: Ted V. Mercer, Portland; Ibrahim Qutub, Beaverton, both of Oreg.

[73] Assignee: Freightliner Corporation, Portland, Oreg.

[21] Appl. No.: 09/123,707

[22] Filed: Jul. 28, 1998

Related U.S. Application Data

[63] Continuation-in-part of application No. 08/735,965, Oct. 23, 1996, Pat. No. 5,873,429.

[51] Int. Cl.[7] .................................................... F16L 3/00
[52] U.S. Cl. ............................ 248/59; 180/309; 248/608
[58] Field of Search ................................ 248/609, 608, 248/638, 635, 634, 201, 58, 59, 60, 62, 587; 267/279, 276, 281, 285, 141.2; 180/89.2, 309, 296; 60/322, 687

[56] References Cited

U.S. PATENT DOCUMENTS

| | | | |
|---|---|---|---|
| 1,800,434 | 4/1931 | Christman | 267/141.2 |
| 2,051,043 | 8/1936 | Herold | 248/609 |
| 2,087,254 | 7/1937 | Herold | 248/609 X |
| 2,744,706 | 5/1956 | Gerdy | 248/60 |
| 3,197,983 | 8/1965 | Ilmer | 248/609 X |
| 4,209,155 | 6/1980 | Florian | 248/62 |
| 4,273,477 | 6/1981 | Murphy | 406/39 |
| 4,387,605 | 6/1983 | Grey et al. | 248/609 X |
| 4,654,612 | 3/1987 | Smith | 333/248 |
| 5,197,698 | 3/1993 | Bartholomew | 248/60 |
| 5,433,422 | 7/1995 | Ross et al. | 267/140.15 |
| 5,570,861 | 11/1996 | Olsen et al. | 248/74.1 |
| 5,649,685 | 7/1997 | Keller | 248/638 |
| 5,687,948 | 11/1997 | Whiteford et al. | 248/635 |
| 5,722,631 | 3/1998 | Dorton | 248/635 |
| 5,873,429 | 2/1999 | Qutub | 180/309 |

FOREIGN PATENT DOCUMENTS 167833 2/1955 Australia ................................ 267/279

*Primary Examiner*—Ramon O. Ramirez
*Attorney, Agent, or Firm*—Klarquist Sparkman Campbell Leigh & Whinston LLP

[57] ABSTRACT

A support arrangement for an exhaust system including an upright muffler and an upwardly-extending exhaust stack located behind the cab of a truck. An arm is mounted on a frame member of the truck, and a vibration isolator supported on the arm in turn supports the weight of an exhaust pipe elbow, a muffler, and a stack located above the muffler, all oriented generally upwardly. An upper connecting assembly is attached to the exhaust stack and to a mounting fastened to the back side of the cab to support the muffler and stack with respect to longitudinal and lateral movement relative to the truck while still permitting some vertical movement of the cab relative to the frame. In one embodiment the upper connecting assembly is attached by way of elastomeric members which permit yet resist movement.

15 Claims, 10 Drawing Sheets

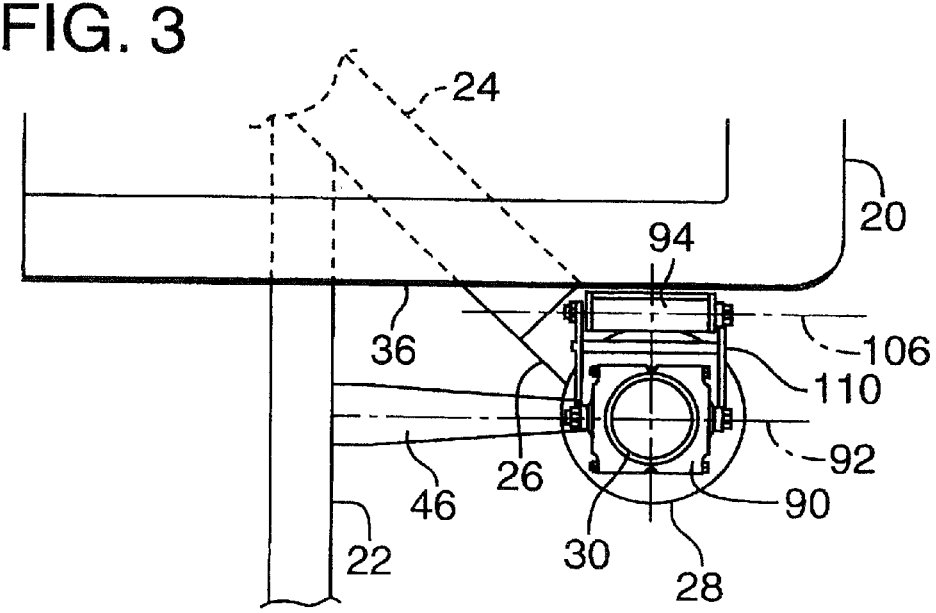
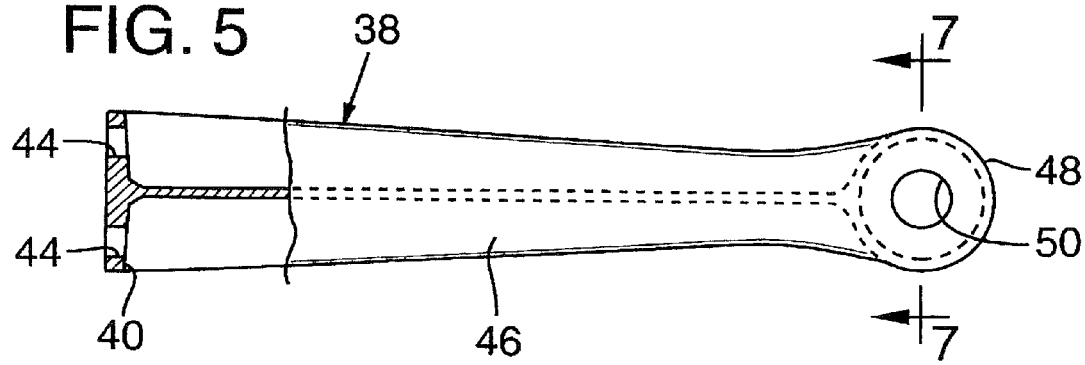
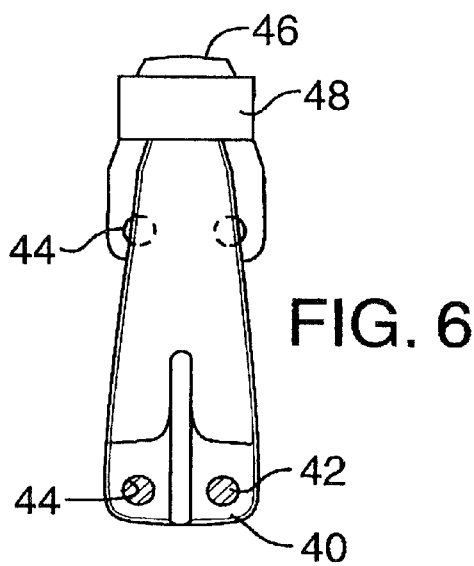
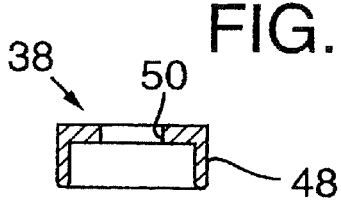

EXHAUST SYSTEM SUPPORT ARRANGEMENT

This application is a continuation-in-part of application Ser. No. 08/735,965, filed Oct. 23, 1996 now U.S. Pat. No. 5,873,429.

BACKGROUND OF THE INVENTION

The present invention relates to trucks, and in particular relates to provision of mechanical support for portions of an engine exhaust outlet system for a heavy-duty truck.

It is common to place a muffler in an exhaust system for a heavy-duty semi-trailer truck in a vertical orientation, with an exhaust outlet pipe, or stack, extending further upward above the top of such a muffler to emit exhaust gases from the engine of such a large truck at some distance above the cab of the truck, so that exhaust gases will be dissipated quickly without being drawn into the cab. Locating such vertically-oriented mufflers behind the cab of such a large truck is desirable for various reasons which do not relate to the present invention. In the past, however, the mechanical supports for the exhaust system of such large trucks, and in particular for the mufflers and upwardly-extending exhaust stacks of such trucks have usually included support framework mounted on the frame of the truck. Such support framework has included diagonal cross bracing to hold a muffler and stack securely, with no interconnection between the muffler or stack and the cab of such a large truck, at least partly because the cab of a large truck is usually supported on the frame through resilient mounting devices, to isolate the cab and its occupants from at least a part of the vibration experienced by the chassis of the truck. Such exhaust system support arrangements in the past have been somewhat expensive and have added undesirable weight to the trucks on which they are used.

Keller U.S. Pat. No. 5,649,685 discloses an apparatus for attaching a muffler to the rear of a truck cab that does permit relative movement between the cab and the muffler. Unfortunately, the apparatus attaches to the front of the muffler, allowing the muffler to travel only along an arc of fairly small radius, which couples vertical movement with considerable unneeded and unwanted horizontal movement.

What is desired, then, is a support system, for a portion of an exhaust system including a vertically oriented muffler and stack, which is of simpler construction than has previously been known, yet which provides ample resilient support for such muffler and stack without interfering with the isolation of the cab from the frame of such a truck.

SUMMARY OF THE INVENTION

The present invention provides a support arrangement for a portion of an exhaust outlet system for a motor vehicle such as a heavy-duty truck which is relatively simple yet provides ample support for the portions of an engine exhaust system including an upright muffler and stack of such a truck.

In accordance with the present invention, a connecting assembly for the upper end of an exhaust system includes an H-shaped linking structure having a transverse eye on each end of each leg of the H. Each eye contains a tubular elastomeric member surrounding a central core that is adapted to be fastened either to a mounting bracket on a motor vehicle, as on the cab of a heavy-duty truck, or to the exhaust outlet stack of such a vehicle, so that movement of the exhaust system relative to the truck cab is accommodated by elastic deformation of the elastomeric members, and the elastomeric material attempts to return the muffler to its normal neutral position.

In a preferred embodiment of the invention, a lower end of an upright muffler and exhaust stack, together with an exhaust pipe elbow located beneath the muffler, are supported upon a lower exhaust system support assembly attached to a frame member of a motor vehicle such as a heavy truck. The lower support assembly includes an arm, or bracket, extending generally laterally away from the frame member and having an outer end provided with a resilient vibration isolating attachment device which both supports and attaches the exhaust pipe elbow, so that the muffler and exhaust stack extend substantially directly upward above the outer end of the support arm, and so that the frame of the vehicle supports substantially the entire weight of the exhaust pipe elbow, muffler, and stack. A stabilizing upper support assembly interconnects the exhaust stack or outlet end of the muffler with the back side of a cab of the vehicle, supporting the upper portion of the exhaust system in the longitudinal and lateral directions with respect to the frame of the motor vehicle.

In one embodiment of the invention, the lower support assembly includes a cast aluminum bracket or arm bolted to a vertical side of a longitudinal frame member of the vehicle, and an attachment bracket welded to an exhaust pipe elbow is attached to and supported atop an elastomeric vibration isolator supported on the outer end of the cast aluminum bracket.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 3 is a top plan view of the portion of a heavy-duty truck and portion of an exhaust system shown in FIGS. 1 and 2.

FIG. 5 is a top plan view of the lower support member shown in FIG. 4.

FIG. 6 is an outer end view of the lower support 6 member shown in FIGS. 4 and 5.

FIG. 7 is a section view taken along line 7—7 of FIG. 5.

DETAILED DESCRIPTION OF THE PREFERRED EMBODIMENT

Figure 1:
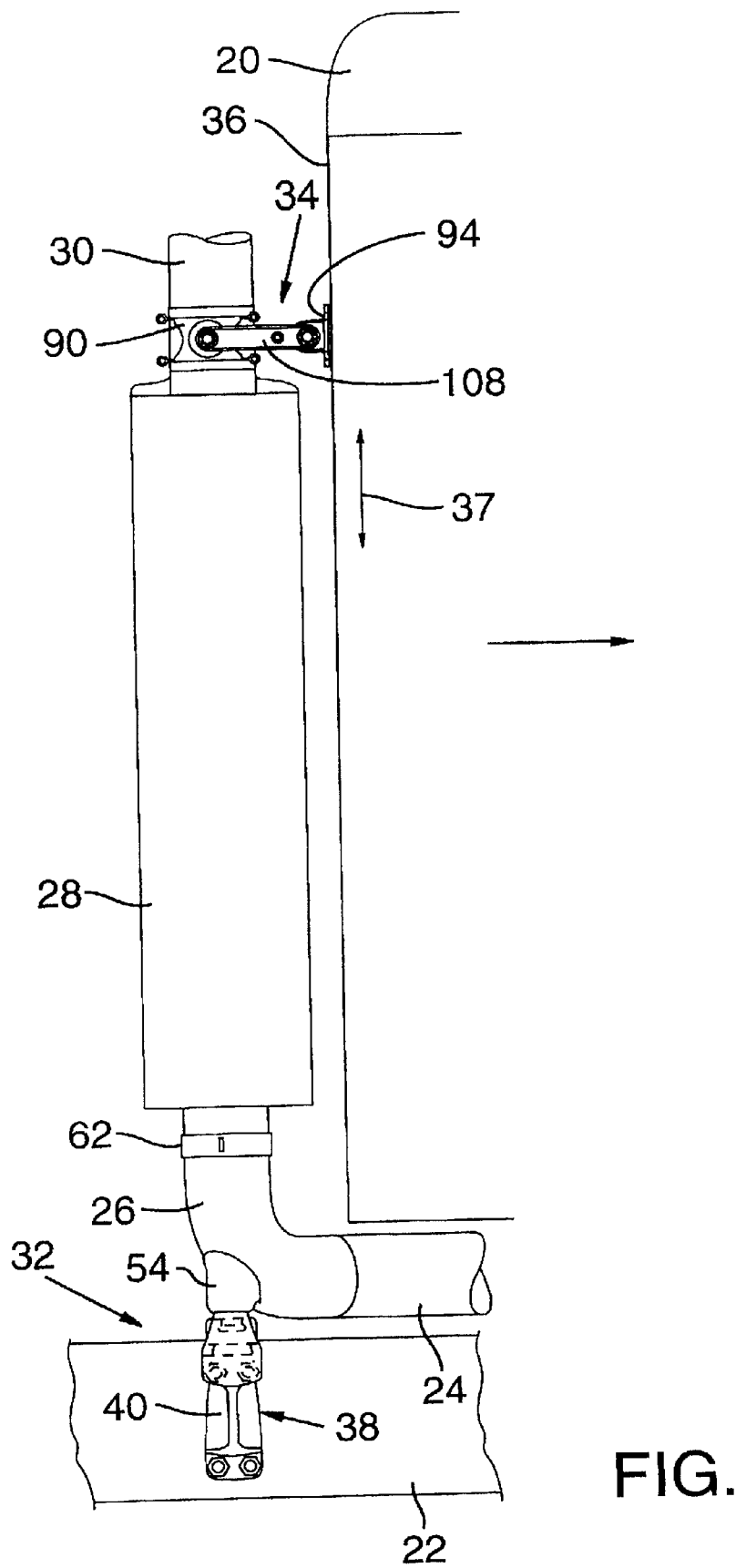
FIG. 1 is a side elevational view of a portion of a cab of a heavy-duty truck, showing a portion of an exhaust system support according to the present invention.
Figure 2:
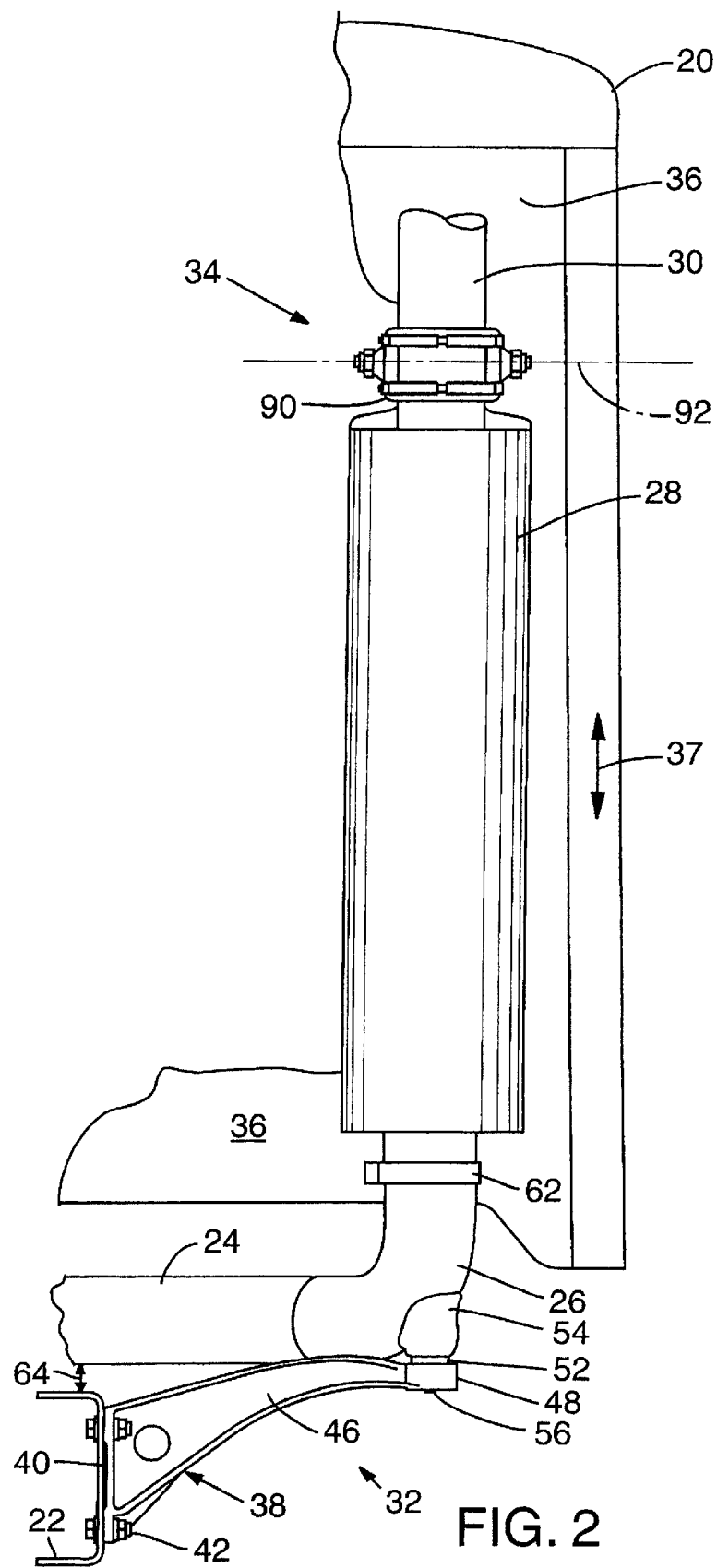
FIG. 2 is a rear elevational view of the portion of a truck and portion of an exhaust system shown in FIG. 1.
Figure 4:
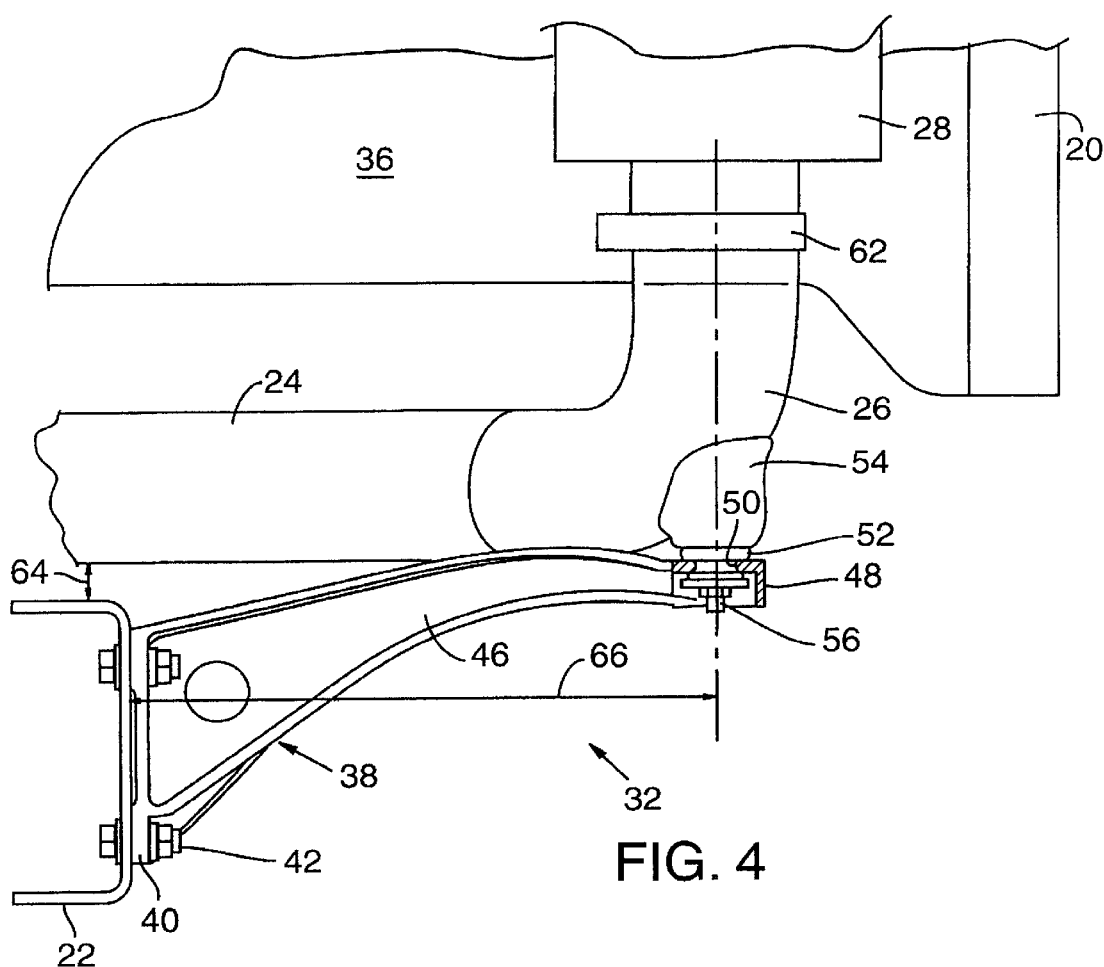
FIG. 4 is a rear elevational view of a lower support assembly for an exhaust system as shown in FIG. 2, at an enlarged scale.

Referring now to the drawings which form a part of the disclosure herein, and in particular referring to FIGS. 1, 2, 3, and 4, a portion of a resiliently mounted cab 20 of a motor vehicle such as a heavy-duty semi-trailer truck is shown located above a longitudinal frame member 22 of the truck. An engine exhaust pipe 24 extends rearwardly above the frame member 22 to an exhaust pipe elbow 26, above which is locate d a vertically oriented generally cylindrical muffler 28. An exhaust stack 30, which is a tubular outlet conduit for further movement of exhaust gases exiting from the muffler 28, is attached to the upper end of the muffler 28 and extends upwardly above it to an open end (not shown) from which the exhaust gases eventually are permitted to escape. While the right side of the truck is shown, a similar arrangement could be provided on the left side as well.

The exhaust pipe elbow 26, muffler, 28, and stack 30 are held in a generally vertical orientation and located behind the cab 20, by an exhaust system support arrangement according to the present invention including a lower support assembly 32 attached to the frame 22 of the truck and an upper support assembly 34 attached to a back side 36 of the cab 20.

Typically, the cab 20 is supported above the frame 22 by a vibration isolation mounting, which may include either rubber or other elastomeric components or gas-filled shock absorbers, allowing the cab 20 to move generally vertically a small distance with respect to the frame 22 as indicated by the arrow 37, so that the cab 20 and its occupants do not feel all of the vibration experienced by the frame 22. The relative movement between the cab 20 and the frame 22 in the direction of the arrow 37 is accommodated by the upper support assembly 34, while the lower support assembly 32 supports the weight of the rearmost portion of the exhaust pipe 24, as well as the exhaust pipe elbow 26, muffler 28, and stack 30.

The lower support assembly 32 includes a generally horizontally-extending bracket or support member 38, which may be an aluminum casting, and which has a base 40 extending generally vertically, aligned with a vertical surface of the frame member 22 and securely attached to the frame member 22 by fasteners such as mounting bolts 42 received in holes 44 defined in the base 40. Extending from the base 40 and laterally away from the frame member 22 is a support arm 46 having an outer end 48 that defines a mounting hole 50. A vibration isolator mount 52 is held in the mounting hole 50, and a support bracket 54, which may be of formed sheet metal welded to the exhaust stack elbow 26, rests atop the vibration isolator 52. A fastener such as a bolt 56 extends through a hole 58 defined in a horizontal bottom portion 60 of the support bracket 54, fastening it to the outer end 48 so that the rearward portion of the exhaust stack 24, the exhaust stack elbow 26, the muffler 28, and the stack 30 are all held above the vibration isolator 52, extending upward and supported by the outer end 48 of the lower support member 38, with the bolt 56 located substantially centrally beneath the muffler 28 and the stack 30. The bolt 56 may be welded into place in the bracket 54 before it is welded to the elbow 26, or the bracket may include a large enough opening (not shown) to permit the bolt 56 to be inserted later.

The muffler 28 is typically manufactured separately from the exhaust pipe elbow 26, and an inlet pipe in the lower end of the muffler 28 is mated with an upper end of the exhaust pipe elbow 26. The muffler 28 is securely and rigidly attached to the exhaust pipe elbow 26 by a clamp 62.

A preferred structure of the lower support member 38 is shown in FIGS. 5, 6, and 7, where it may be seen clearly that the arm 46 extends laterally, and is arcuately curved and tapered, with a generally "I" cross sectional shape, and is smaller at the outer end 48. The outer end 48 is slightly higher than the top of the base 40, to provide clearance 64 beneath the exhaust pipe 24 and above the frame member 22, as may be seen in FIGS. 1, 2, and 4. The arm 46 may have a length 66 of 464 mm to the center of the mounting hole 50, for example, to support the exhaust pipe elbow 26 where the muffler 28 will be in a desired position with respect to the back 36 of the cab 20, although the length 66 could vary in different trucks.

Figure 8:
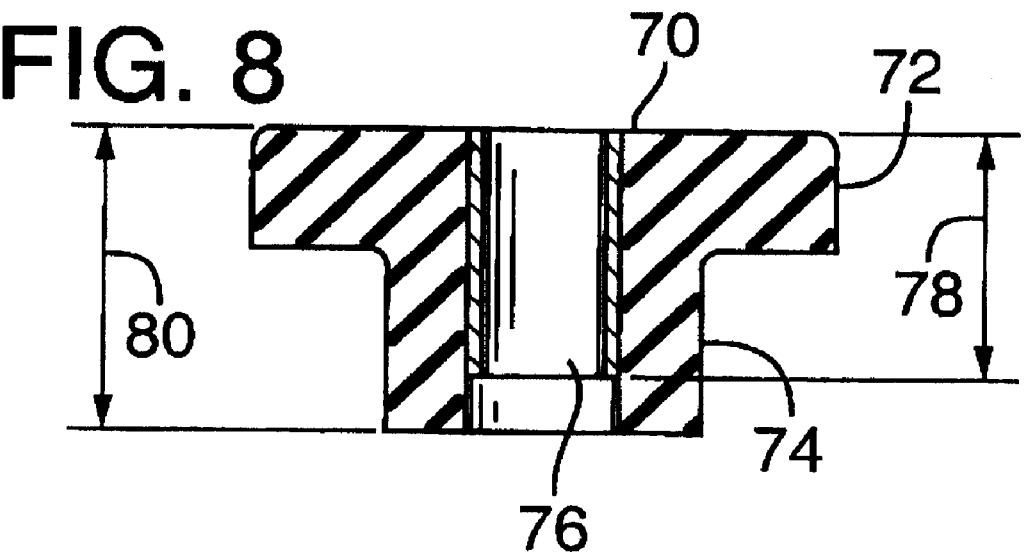
FIG. 8 is a sectional view of an elastomeric vibration isolator mounting, shown apart from the lower support arm.
Figure 9:
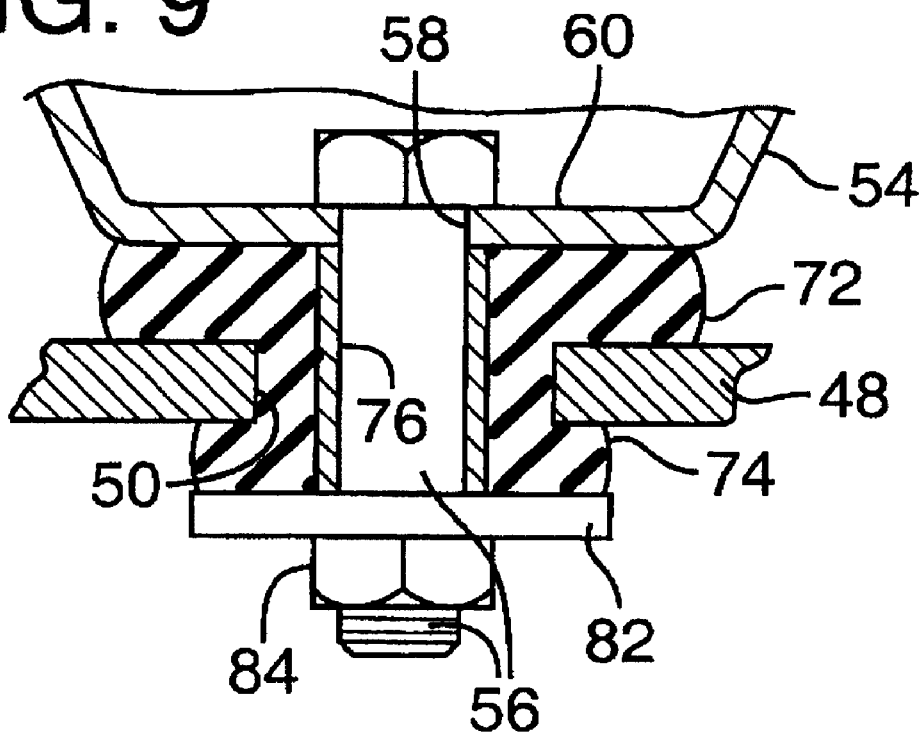
FIG. 9 is a sectional view of the vibration isolator shown in FIG. 8, in use attaching the exhaust pipe elbow shown in FIG. 4 to the outer end of the lower support arm.

Referring also to FIGS. 8 and 9, the vibration isolator 52 includes a tubular "biscuit" or body 70 of a compressible, tough elastomeric material such as a durable yet flexible rubber with a durometer hardness of between 50 and 70, for example. The body 70 includes a circular radial flange portion 72 above a cylindrical lower portion 74 of a smaller diameter, shown in a relaxed state in FIG. 8. Within a central bore extending through the body 70 is an internal support tube 76 of metal having a length 78, which is less than the overall length 80 of the body 70 in its relaxed condition.

With the support bracket 54 of the exhaust pipe elbow 26 resting atop the flange 72 and the lower portion 74 of the body 70 extending through the hole 50 defined in the outer end 48 of the support arm 46, a threaded nut 84 is tightened on the bolt 56 against a washer 82, so that the elastomeric body 70 is compressed longitudinally to the length 78 of the tube 76. This causes the elastomeric body 70 also to expand radially, both above and beneath the hole 50 through the outer end 48, creating a radial bulge in the lower portion 74 between the washer 82 and the underside of the outer end 48, beneath the hole 50. Thus deformed by compression, the elastomeric body 70 of the vibration isolator 52 provides resilient isolation of the exhaust pipe elbow 26 from the outer end 48 and allows a small degree of tilting, yet restrains the exhaust pipe elbow 26 against significant movement upward, downward, or in any horizontal direction with respect to the outer end 48. The weight of the exhaust pipe elbow 26, muffler 28, and stack 30 is thus supported atop the outer end 48, yet the muffler 28 and stack 30 are substantially isolated from the frame member 22.

Figure 10:
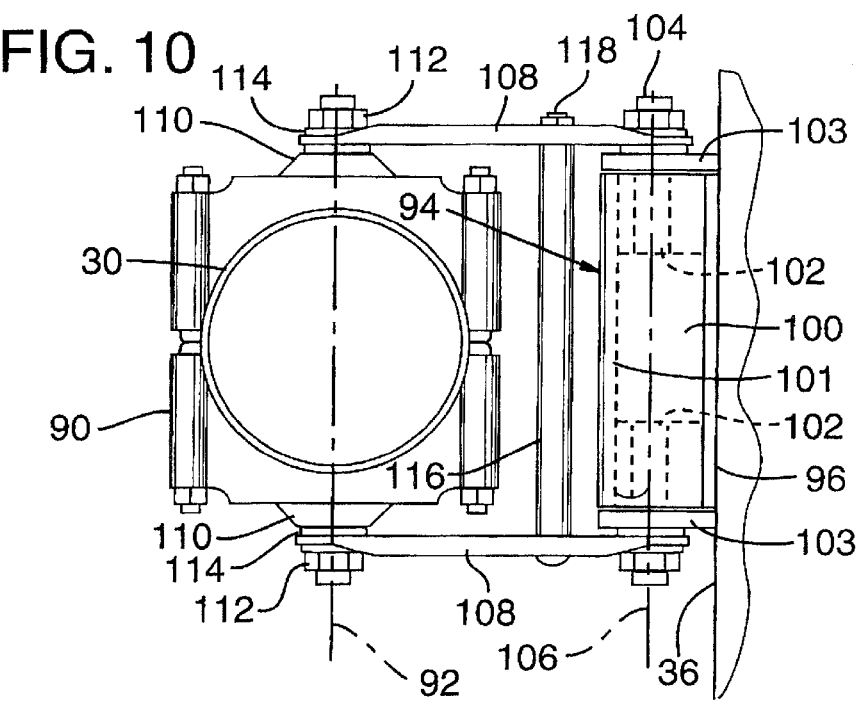
FIG. 10 is a top plan view of the upper support assembly attaching the stack to the cab.
Figure 11:
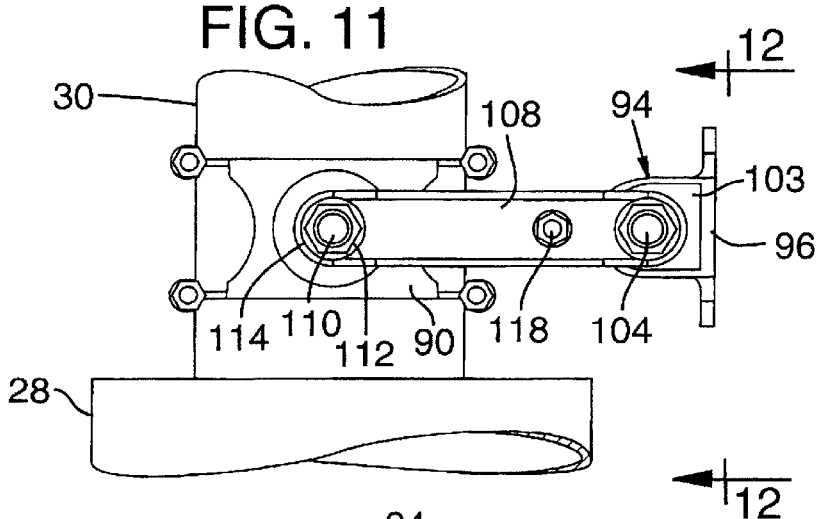
FIG. 11 is a side elevational view of the assembly shown in FIG. 10.
Figure 12:
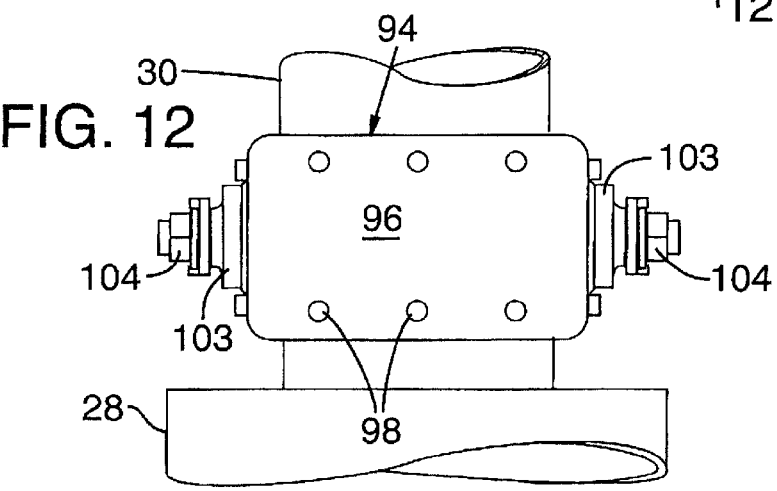
FIG. 12 is a front view of the upper exhaust system attachment assembly shown in FIGS. 10 and 11 taken along line 12—12 of FIG. 11.
Figure 13:
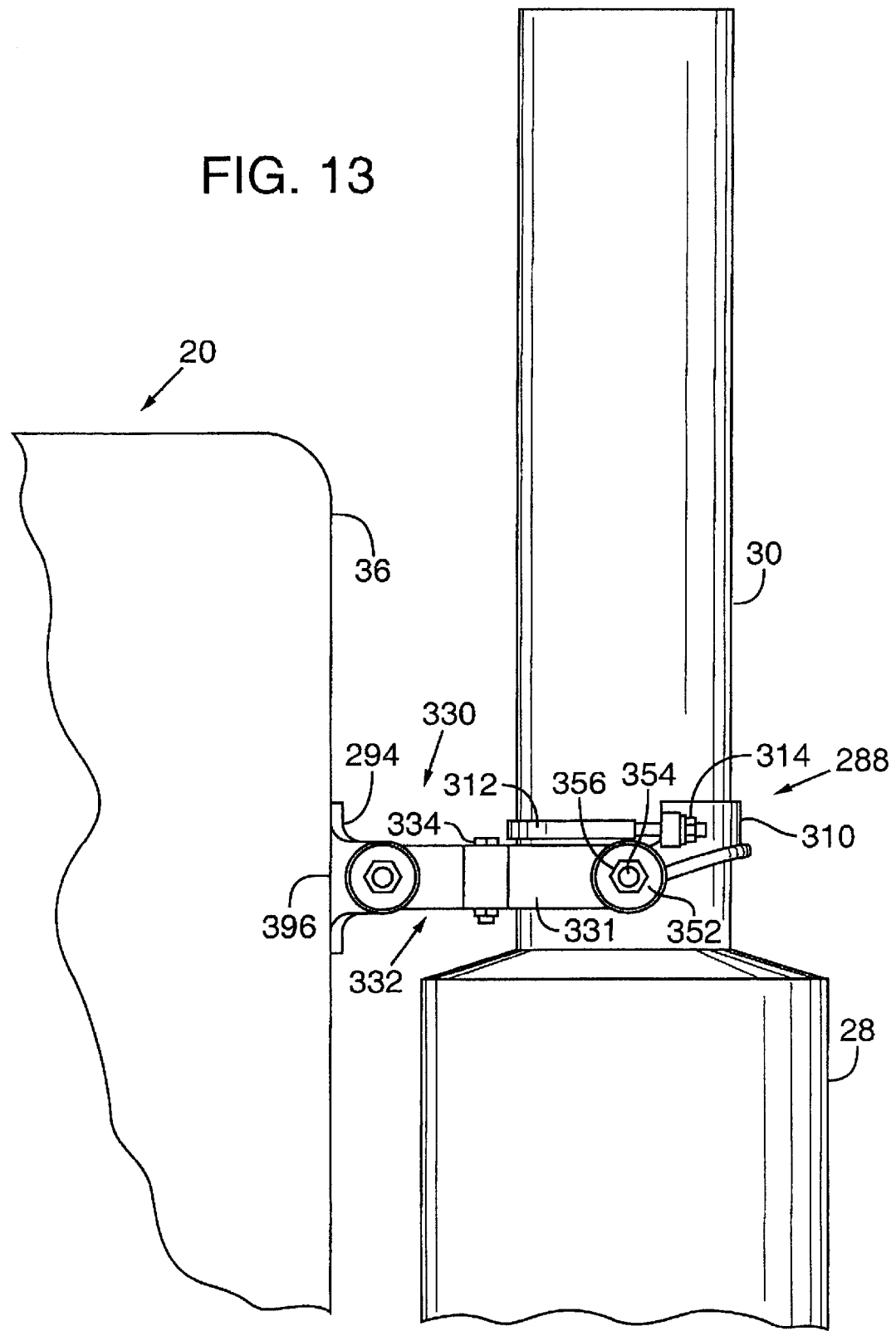
FIG. 13 is a side elevational view of a portion of a cab of a heavy-duty truck, showing an upper support assembly for an exhaust system, according to an alternative embodiment of the present invention.
Figure 14:
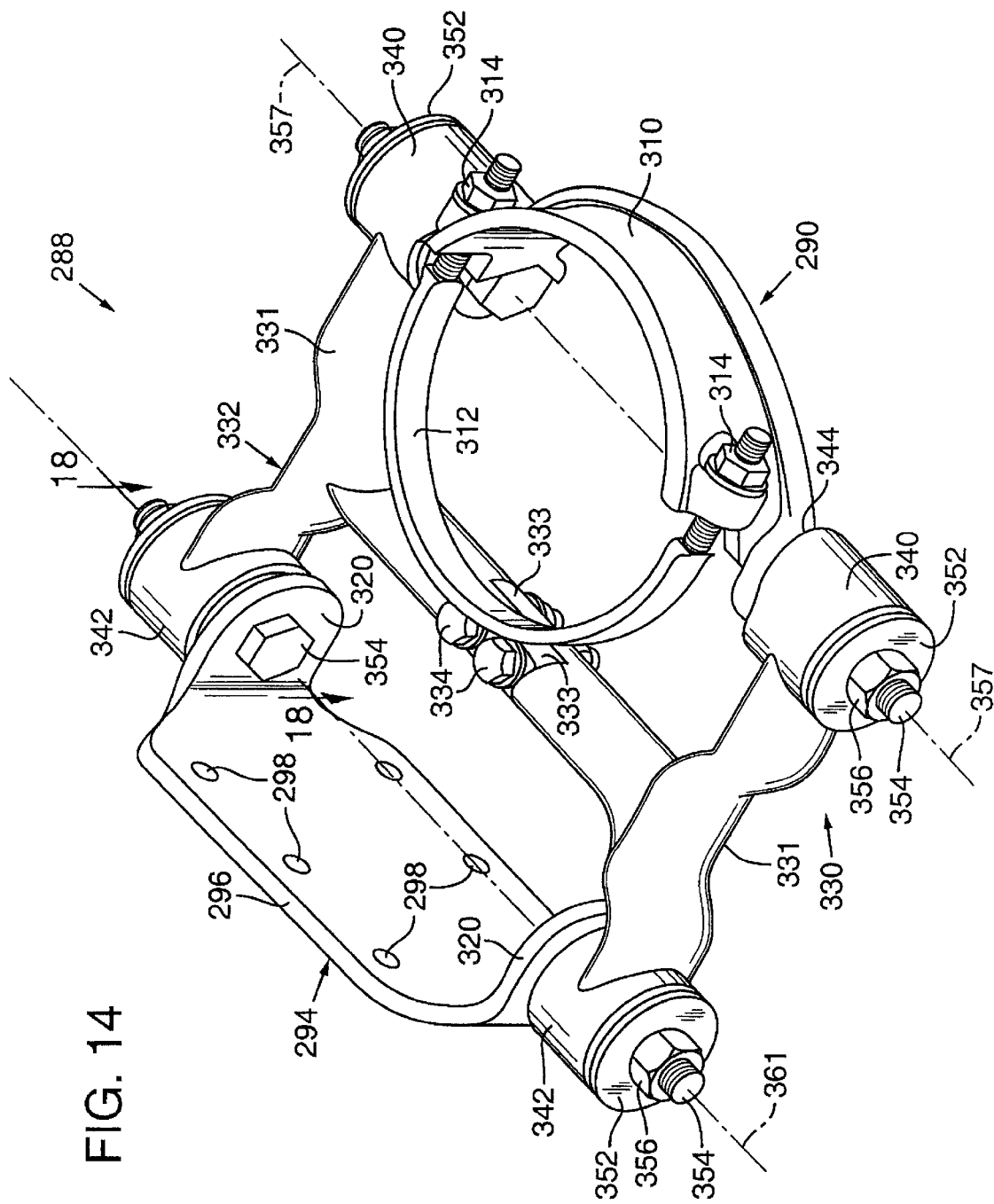
FIG. 14 is a perspective view of an exhaust system upper support assembly as shown in FIG. 13, at an enlarged scale.
Figure 15:
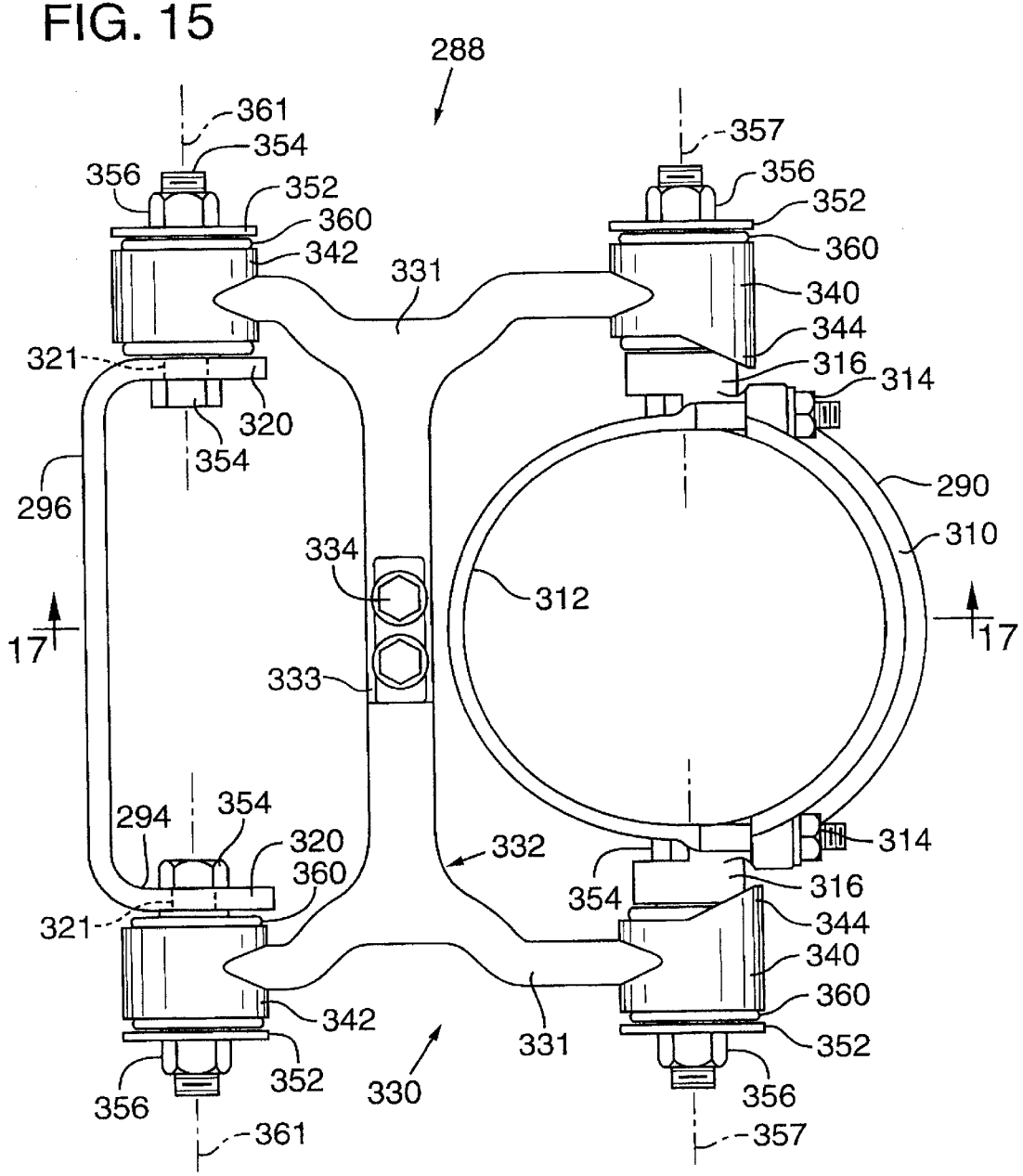
FIG. 15 is a top plan view of the exhaust system upper support assembly shown in FIG. 14.
Figure 16:
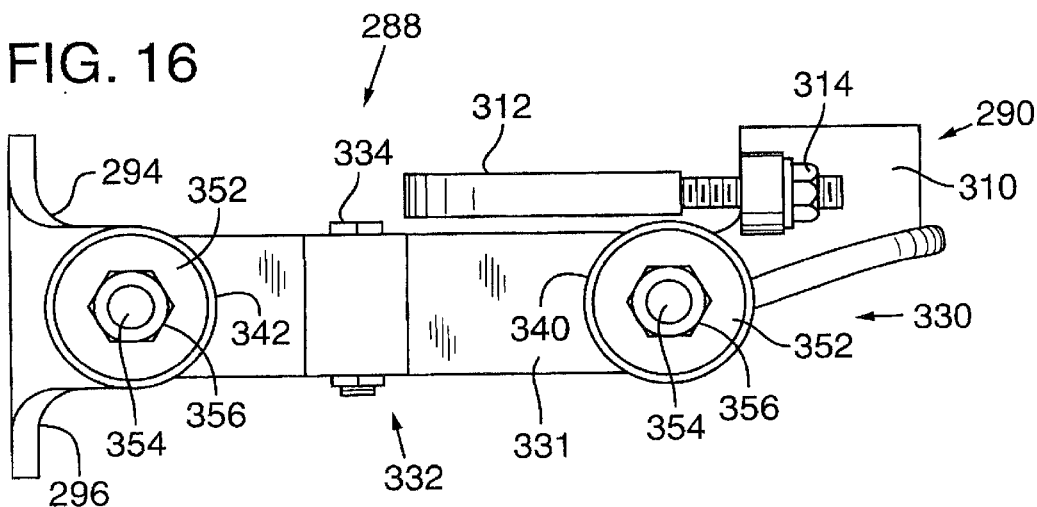
FIG. 16 is a side elevational view of the exhaust system upper support assembly shown in FIG. 14 and FIG. 15.
Figure 17:
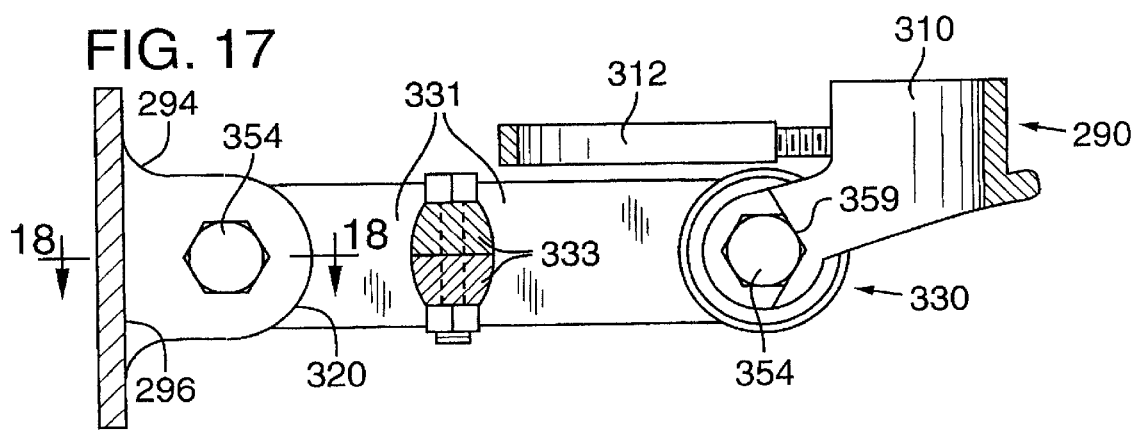
FIG. 17 is a sectional side view of the exhaust system upper support assembly shown in FIGS. 14, 15, and 16, taken along line 17—17 o f FIGS. 15.

The upper support assembly 34, in a preferred embodiment of the invention, includes a clamp 90, best shown in FIGS. 10 and 11, which securely grips the muffler outlet tube near its connection with the stack 30 a small distance above the top of the body of the muffler 28. The clamp 90 may also serve to attach the stack 30 to the outlet of the muffler 28, but its primary purpose is to establish a rear horizontal pivot axis 92 extending parallel with the back surface 36 of the cab 20, that is, extending generally perpendicular to the length of the truck.

A mounting member 94 includes a flat base 96 defining fastener holes 98 receiving fasteners such as suitable screws to attach the mounting member 94 securely to the back 36 of the cab 20. A tubular body 100 defining a "D" shaped interior cavity 101 is formed integrally with the base 96.

At each end of the body 100, a plug 102 of rubber or another elastomeric material extends a distance into the D-shaped cavity of the body 100, leaving a space within the cavity between the plugs 102. A bushing 103 of a self-lubricating plastic such as Nylon is located at each end of the body 100. Each of the plugs 102 defines a bore through which a fastener such as a bolt and nut combination 104 extends laterally through the bushings 103 and the plugs 102 define a front horizontal pivot axis 106, while the plugs 102 provide a cushioned, vibration-isolating interconnection between the bolt 104 and the mounting 94.

A pair of links 108, which may be of formed sheet steel, extend between the bolt 104 and a pair of trunnions 110, each located on and a part of a respective side of the clamp 90. The trunnions 110 thus define the rear horizontal pivot axis 92. Preferably, the trunnions have threaded end portions to which a rearward end of each link 108 is attached, as by a respective self-locking nut 112 or other suitable fastener, preferably with self-lubricating bushings and washers 114 between each link 108 and the respective trunnion 110, to allow the links 108 to rotate easily about the trunnions 110 in response to relative movement between the cab 20 and the frame 22. Preferably, a crossbar 116, which may be a small diameter tube held in place by a fastener such as a bolt and nut combination 118, extends between the links 108 to establish their positions parallel with each other.

With the bottom of the upright portions of the exhaust system supported and attached firmly to the frame by the lower support assembly 32, the upper support assembly 34 keeps the pipe 30 and muffler 28 aligned vertically above the exhaust stack elbow 26, both later-ally and longitudinally with respect to the truck, yet permits the cab 20 to move as required relative to the frame of the truck. Sufficient flexibility is available in the exhaust pipe 24 and in the attachment of the exhaust pipe elbow 26 to the lower support assembly 32 to allow for a slight amount of forward movement resulting from inclination of the links 108 as they pivot.

FIGS. 13–18 show an upper support assembly 288 for an exhaust outlet system that is an alternative embodiment of the invention. The lower portion of such an exhaust system support assembly may be similar to that shown in FIGS. 1–12. The upper assembly 288 includes a clamp 290, for fixing the exhaust stack 30 in engagement with the muffler 28 and for attaching the upper support assembly 288 to the muffler 28 and stack 30. The clamp 290 includes a clamp body 310 and a horizontally extending U-shaped strap 312 with threaded ends extending through corresponding holes in the clamp body 310 and connected with the clamp body 310 by a corresponding pair of nuts 314. The clamp 290 thus squeezes the upper end of the muffler 28 around the exhaust stack 30. The clamp body 310 also includes a pair of opposed ears 316, one at either side, preferably located on diametrically opposite sides of the stack 30.

A mounting member 294 affixed to the back side 36 of truck cab 20 includes a base 296 defining a set of fastener holes 298 to receive fasteners such as screws, in a manner similar to the attachment of the mounting member 94 as shown in FIG. 1. The mounting member 294 may be of bent plate steel, and a pair of ears 320 extend rearwardly from the base 296, parallel with each other.

To retain and support the upper portion of the exhaust system, yet permit variations in the relative positions of cab 20 and frame 22, the clamp 290 must be operatively connected to member 294 with enough rigidity to hold the clamp 290 in place, substantially aligned vertically with the ears 320 of the mounting member 294, and yet with sufficient flexibility to absorb the vibrations and temporary variations, primarily vertical, in relative positions of the cab 20 and the truck frame 22. It is also desirable for the exhaust system upper support structure 288 to be light in weight and inexpensive to produce.

A connecting assembly 330 attaches the clamp 290 to the mounting member 294 and helps to satisfy these requirements. The connecting assembly 330 includes a pair of identical T-shaped sections 331 that include overlapping half-thickness end portions 333 as the base of the stem of each "T." The end portions 333 are fastened together with a pair of fasteners such as bolts and mating nuts 334 to form an H-shaped linking structure 332 as part of the connecting assembly 330, with the crossbar of each T-shaped piece becoming a leg of the H-shaped structure. The T-shaped sections 331 are preferably made of cast aluminum, for low weight, although cast steel or reinforced synthetic plastics could also be used.

The rearward (with respect to the truck) ends of the two legs of the H-shaped linking structure 332 each include a rearward transverse eye 340. Likewise, the forward end of each of the two legs of the linking structure 332 includes a similar forward transverse eye 342. The forward eyes 342 and their associated fittings are identical to the rearward eyes 340 except that the rearward eyes 340 each include an inward extension 344 that serves a protective function. Each of the eyes 340, 342 have cylindrical interior surfaces and a pair of opposite ends.

Figure 18:
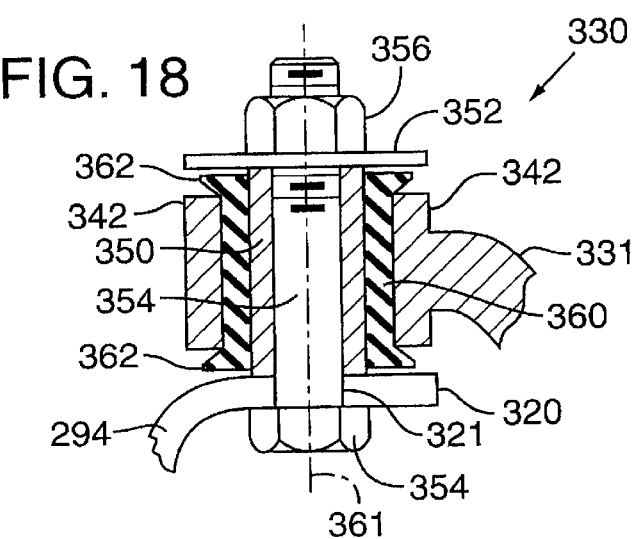
FIG. 18 is a sectional detail view, at an enlarged scale, of a portion of the exhaust system upper support assembly shown in FIG. 14, taken along lines 18—18 of FIGS. 14 an d 17.

FIG. 18 shows one of the forward transverse eyes 342 and closely associated elements of the exhaust system upper support assembly 288 in sectional view. The assemblies within the other eye 342 and each of the eyes 340 are substantially identical and so they will not be described separately.

Within each eye 340 or 342 is a sleeve-like tubular elastomeric member 360 of a tough material, such as rubber, that has strength to withstand significant deformation elastically in both tension and compression. The elastomeric material of the tubular elastomeric member 360 should also be able to withstand somewhat elevated temperatures and UV radiation. One satisfactory elastomeric material is a high temperature EPDM rubber with a durometer hardness of about 53, available from Tenneco Automotive of Monroe, Michigan as its formulation number 21FR333D. Each tubular elastomeric member 360 is long enough to extend a small distance, such as 0.15 inch beyond each end of the respective eye 340 or 342. Within each tubular elastomeric member 360 is a rigid core preferably in the form of a steel tube 350 that extends a small distance beyond each end of the tubular elastic member 360. Each eye 340 or 342 and the respective tubular elastic member 360 and rigid core are located coaxially.

Preferably, each tubular elastomeric member 360 is produced separately, as by being molded, and then the elastomeric member 360 and the associated tube 350 are simultaneously pushed into place in an eye 340 or 342 from opposite directions, with the elastomeric material thus being compressed radially by about 30% to 40% of its original size, as by a nominal interference distance of about 0.216 inch from a relaxed radial thickness of about 0.500 inch. The elastomeric material thus bulges at each end of the respective eye 340 or 342 as shown at 362, and cushions and spaces each eye 340 or 342 from each tube 350. The compression of the elastomeric material of the members 360 prevents this elastomeric material from moving with respect to the interior surfaces of the eye 340, 342 or the outer surfaces of the rigid cores 350 under expected forces. A suitable adhesive also could be used, if desired, to help prevent movement of the tubular elastomeric members 360.

A respective bolt 354 and an associated flat washer 352 and nut 356 are used to attach the connecting assembly 330 to the ears 320 of the mounting member 294 and to the ears 316 of the clamp body 310. Preferably, a bolt 354 extends through a bore 321 in each ear 320 of the mounting member 294 and is tack welded in place. Similarly, other bolts 354 extend through bores (not shown) defined in the ears 316, where the heads of the bolts 354 are captured in V-shaped recesses shown at 359, and surfaces of the clamp body 310 prevent the bolts 354 from rotating. The T-shaped sections 331 are separately placed onto their respective sides of the mounting member 294 and the clamp 290, after which the T-shaped sections are fastened together to form the H-shaped linking structure 332. The tubes 350 are parallel and aligned in collinear pairs to define a first, or forward horizontal axis 361 and a second, or rearward horizontal axis 357. When the nuts 356 are tightened against the flat washers 352 on the bolts 354, the rigid core tubes 350 are rigidly fastened to the respective ears 316 and 320. The length of each tube 350, however, leaves a clearance space between each washer 352 and ear 316 or 320 and the respective tubular elastomeric member 360.

The elastomeric members 360 are deformed elastically by movement of the respective eyes 340 or 342 relative to the tubes 350 and thus resist rotation of each eye 340 and 342 about the rearward horizontal axis 357 or forward horizontal axis 359, respectively. This rotation permits the H-shaped linking structure 332 to slope upward or downward from its horizontal neutral position, thereby accommodating vertical variations in the relative positions of the frame 22 and the cab 20. After such movement the elastomeric members 360 urge the H-shaped linking structure 332 back toward a neutral position.

The advantages provided by the connecting assembly 330 should now be evident. The cushioned and rotatable mounting of the eyes 340 and 342 about the tubes 350 permits the clamp 290 to change position vertically (along an arc) relative to the position of base 296, to accommodate changes in relative position between the truck frame 22 and the cab 20. Moreover, the elastomeric members 360 absorb much of the smaller amplitude, higher frequency vibrations, which otherwise would cause wear of contacting surfaces of the tubes 350 and eyes 340 and 342. The elastomeric members 360 also help to shield the cab 20 from the vibrations of the exhaust system.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A mounting assembly for connecting a portion of an exhaust system to a motor vehicle body, comprising:
   (a) a linking structure defining at least one first eye defining a first pivot axis-and at least two additional eyes spaced apart to fit on either side of a tubular portion of said exhaust system and defining a second pivot axis;
   (b) a coupler adapted for receiving the tubular portion of said exhaust system and coupled to the linking structure;
   (c) a rigid core located within each said eye, said rigid core of said at least one first eye for being operatively connected to said motor vehicle body and said rigid cores of said additional eyes for being operatively connected to said coupler; and
   (d) a respective tubular elastomeric member disposed around each said rigid core and within a corresponding one of said eyes, said elastomeric members being deformed elastically by and resisting rotation of said one of said eyes about the corresponding one of said pivot axes to limit relative movement of said exhaust system with respect to said motor vehicle body.

2. The mounting assembly of claim 1 in said linking structure is H-shaped including a pair of parallel legs each having a pair of ends and wherein there are at least two of said first eyes defining a first pivot axis, and wherein each eye is positioned on a respective end of a corresponding one of the legs.

3. The mounting assembly of claim 2 in which said linking structure includes first and second spaced apart legs each having a forward end, the linking structure including a cross portion which detachably interconnects the first and second legs, each leg having a forward eye and a rear eye, the forward eyes of the first and second legs being aligned and defining a forward pivot axis, the rear eyes of the first and second legs being aligned to define a rear pivot axis, being positioned to carry the coupler and being spaced apart sufficiently to receive at least a portion of the portion of the exhaust system therebetween.

4. The mounting assembly of claim 3 in which the first and second legs each include a section of the cross portion, each leg together with the section of the cross portion being substantially T-shaped.

5. The mounting assembly of claim 1 in which each of said eyes has two opposed ends and each of said tubular elastomeric members extends outwardly beyond both of said opposed ends.

6. The mounting assembly of claim 1 in which each of said tubular elastomeric members has two opposed ends and a corresponding one of said rigid cores extends outwardly beyond both of said opposed ends.

7. A mounting assembly for connecting a portion of an exhaust system to a motor vehicle body, comprising:
   (a) a mounting member;
   (b) a linking structure defining at least one first eye defining a forward pivot axis extending through a portion of said mounting member, the linking structure defining at least two additional eyes spaced apart to fit on either side of a tubular portion of said exhaust system and defining a horizontal, transversely extending rear pivot axis;
   (c) a clamp assembly adapted for receiving the tubular portion of said exhaust system and including at least two ears, each ear being positioned adjacent to a respective one of the two additional eyes;

(d) a rigid core located within each said eye, said rigid core of said first eye fastened to said mounting member and each of said rigid cores of said additional eyes fastened to a respective ear of said clamp assembly; and (e) a respective tubular elastomeric member disposed around each said rigid core and within a corresponding one of said eyes, said elastomeric members being deformed elastically by and resisting rotation of said one of said eyes about the corresponding one of said pivot axes to limit relative movement of said exhaust system with respect to said motor vehicle body.

8. A mounting assembly for connecting part of an exhaust system to a motor vehicle having a frame and a cab, comprising:

(a) a lower support member having a base adapted to be fastened to a member of said frame and an arm extending generally horizontally and having an outer end;

(b) a vibration isolator mount attached to said outer end of said lower support member and arranged to support a load exerted downward on said outer end; and (c) an upper support assembly including:
  (i) a linking structure defining at least one first eye defining a first pivot axis and at least two additional eyes spaced apart to fit on either side of a tubular portion of said exhaust system and defining a second pivot axis, each eye having first and second ends;
  (ii) a rigid core located within each said eye, said rigid core of said first eye for being operatively connected to said motor vehicle body and said rigid cores of said additional eyes for being operatively connected to said exhaust system; and
  (iii) a respective tubular elastomeric member disposed around each said rigid core and within a corresponding one of said eyes, said elastomeric members being deformed elastically by and resisting rotation of said one of said eyes about the corresponding one of said pivot axes to limit relative movement of said exhaust system with respect to said motor vehicle body, said elastomeric members bulging at the first and second ends of each eye in a direction substantially perpendicular to the corresponding pivot axis of each eye.

9. The mounting assembly of claim 8 in which each of said tubular elastomeric members has two opposed ends and a corresponding one of said rigid cores extends outwardly beyond both of said opposed ends.

10. The mounting assembly of claim 8 in which said linking structure is H-shaped including a pair of parallel legs each having a pair of ends and wherein there are four eyes, each eye being positioned on a corresponding end of a respective one of said legs.

11. The mounting assembly of claim 10 in which said linking structure includes two substantially T-shaped elements, fastened together.

12. The mounting assembly of claim 11 in which said T-shaped elements are substantially identical.

13. The mounting assembly of claim 8 in which each of said eyes has two opposed ends and each of said tubular elastomeric members extends outwardly beyond both of said opposed ends.

14. The mounting assembly of claim 8, including a mounting member, said first eye being attached thereto and said first pivot axis being a front pivot axis extending through a portion of said mounting member.

15. The mounting assembly of claim 14, including a clamp assembly including a pair of ears, in which for each of said additional eyes, said rigid core is fastened to a respective one of said pair of ears and said second pivot axis is a horizontal, transversely extending rear pivot axis.

* * * * *

UNITED STATES PATENT AND TRADEMARK OFFICE
CERTIFICATE OF CORRECTION

PATENT NO. : 6,095,460
DATED : August 1, 2000
INVENTOR(S) : Mercer et al.

It is certified that error appears in the above-identified patent and that said Letters Patent is hereby corrected as shown below:

Column 3,
Line 14, change "o f" to -- of --
Line 29, change "locate d" to -- located --

Column 5,
Line 44, change "later-ally" to -- laterally --

Column 7,
Line 42, change "axis 359" to -- axis 361 --

Column 8,
Line 6, change "axis-and" to -- axis and --

Signed and Sealed this

Twenty-third Day of April, 2002

*Attest:*

JAMES E. ROGAN
*Attesting Officer*  *Director of the United States Patent and Trademark Office*